US012653761B2

(12) United States Patent
Turner-Griffiths

(10) Patent No.: US 12,653,761 B2
(45) Date of Patent: Jun. 16, 2026

(54) REVERSIBLY ATTACHABLE TEETHING AID

(71) Applicant: Frolik & Co Ltd, Portsmouth (GB)

(72) Inventor: Scott Turner-Griffiths, Portsmouth (GB)

(73) Assignee: Frolik & Co Ltd., Portsmouth (GB)

( * ) Notice: Subject to any disclaimer, the term of this patent is extended or adjusted under 35 U.S.C. 154(b) by 32 days.

(21) Appl. No.: 18/720,265

(22) PCT Filed: Mar. 20, 2023

(86) PCT No.: PCT/GB2023/050698
§ 371 (c)(1),
(2) Date: Jun. 14, 2024

(87) PCT Pub. No.: WO2023/180727
PCT Pub. Date: Sep. 28, 2023

(65) Prior Publication Data
US 2025/0049642 A1 Feb. 13, 2025

(30) Foreign Application Priority Data
Mar. 21, 2022 (GB) ..................................... 2203937

(51) Int. Cl.
*A61J 17/02* (2006.01)
*A41B 13/10* (2006.01)
*A61J 17/00* (2006.01)

(52) U.S. Cl.
CPC ............... *A61J 17/02* (2013.01); *A41B 13/10* (2013.01); *A61J 17/1111* (2020.05)

(58) Field of Classification Search
CPC ............................... A61J 17/02; A61J 17/1111
See application file for complete search history.

(56) References Cited

U.S. PATENT DOCUMENTS 4,233,714 A * 11/1980 Panicci ................ A44C 5/2042 403/309
9,744,103 B1 8/2017 Ricker

FOREIGN PATENT DOCUMENTS

CN 215230451 * 12/2021
CN 215230451 U 12/2021
GB 2506972 A 4/2014

OTHER PUBLICATIONS

May 29, 2023—(WO) International Search Report and Written Opinion—PCT/GB2023/050698.

* cited by examiner

*Primary Examiner* — Todd J Scherbel
(74) *Attorney, Agent, or Firm* — KellDann Law PLLC; Ross Dannenberg

(57) ABSTRACT

The present invention provides a teething aid comprising a chewable arrangement and at least one reversible fastening means, wherein the reversible fastening means is configured to reversibly attach the chewable arrangement to a portion of fabric and detach the chewable arrangement from the portion of fabric. For example, the teething aid may be configured to reversibly attach to a bib, blanket, muslin or lovey, for example for use by an infant.

19 Claims, 11 Drawing Sheets

REVERSIBLY ATTACHABLE TEETHING AID

FIELD OF THE INVENTION

The present disclosure relates to a teething aid which is configured to be reversibly attached to a portion of fabric, for example to a bib, blanket, muslin or lovey, for example for use by an infant. The present disclosure can also be used by those with disabilities; hence the understanding of the disclosure should not be limited to use with children only.

BACKGROUND

To aid teething, babies and infants often use teething aids to chew on. These teething aids assist the development of teeth by, amongst other things, massaging the infant's gums. However, at the time teething starts, many infants are still developing their motor skills and coordination. Most teethers are designed to be handheld and brought to the mouth to chew on, relying on the baby having a strong grip, and good coordination and attention, which most babies do not possess at this early developmental stage. Handheld teething aids are therefore often dropped by infants for the reasons outlined above. This can cause upset and distress in the infants who become frustrated that their relief is short lived. The teething aid may then have to be retrieved and cleaned by a parent or carer, before being returned to the infant for the cycle to repeat shortly after. This cycle can cause frustration for busy parents also. Furthermore, continued dropping of the teething aid increases the risk of the teething aid becoming contaminated by dirt and bacteria.

Infants also produce a lot of saliva when teething. This saliva will often seep through clothing and cover the chin, neck and chest for significant periods of time, creating a semi-permanent damp environment which often results in a sore skin rash (drooling rash) around the mouth, neck and chest which is difficult to combat once present. This can also cause colds in infants, due to the presence of cold moisture on the chest for extended periods of time. The best method to reduce the possibility of drool rash and colds caused by excessive drooling is to use a bib, for example a bandana bib, which is worn around the neck, covering the infant's chest and neck, preventing excess saliva from reaching the skin.

However, the use of teething aids further increases the production of saliva compounding the problems of drool rash and colds outlined above. As a result of the excess saliva caused by using a teether, wet bibs often need to be removed and replaced with dry bibs frequently throughout the day.

GB2506972 discloses a bib comprising an absorbent bib material portion and a chewable portion, wherein the chewable portion may help to massage gums to aid teething during use. The chewable portion is permanently fastened to the bib, for example by stitching.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In a first aspect of the invention, there is provided a teething aid comprising a chewable arrangement and at least one reversible fastening means. The reversible fastening means is configured to reversibly attach the chewable arrangement to a portion of fabric and detach the chewable arrangement from the portion of fabric.

A first advantage of the present invention may be to provide a teething aid that can reversibly attach to any bib, for example a bandana bib, or any other fabric, preferably wherein the fabric is at least partially absorbent, for example a blanket, muslin or lovey, transforming the functionality of the fabric into a teething aid. This facilitates teething whilst the fabric absorbs excess fluid such a saliva produced during teething. Once the bib or other fabric is damp, the teether may be detached from the damp fabric and re-attached to a dry fabric, meaning that the infant can remain dry throughout their teething experience at all times. This may be advantageous compared to fixed teething bibs, such as that of GB2056972, wherein the teething aid must be removed from the infant for periods of drying once the bib becomes damp, or otherwise risk the infant developing a sore skin rash (drooling rash) or cold.

A second advantage of the present invention may be to provide a teething aid that will stay within reach of the infant at all times, meaning if the infant loses coordination, grip strength or concentration, they can release their hold on the teether and simply pick it up again once they are ready. This is enabled because the teething aid is always attached to a portion of fabric in use, preferably a bib. This may help to soothe the infant, as well as helping parents feel calmer that their child has constant access to teething relief. Furthermore, this may reduce the risk of the teething aid being dropped and becoming contaminated with dirt and bacteria.

In some examples, the chewable arrangement may comprise a first portion and a second portion, wherein the chewable arrangement is configured to reversibly attach to a portion of fabric by clamping the portion of fabric between the first portion and the second portion of the chewable arrangement.

In some examples, the teething aid may be further configured to be transitioned between a first configuration and a second configuration. In the first configuration, the chewable arrangement may be configured to clamp a portion of fabric between the first portion and the second portion of the chewable arrangement. In the second configuration, the chewable arrangement may be configured to detach from the portion of fabric. In some examples, detaching from the portion of fabric comprises unclamping the portion of fabric from between the first portion and the second portion of the chewable arrangement. In some examples, in the first configuration, the teething aid is configured to clamp a portion of fabric between an internal surface of the first portion of the chewable arrangement and an internal surface of the second portion of the chewable arrangement. In some examples, unclamping the portion of fabric in the second configuration comprises displacing the internal surface of the first portion of the chewable arrangement relative to the internal surface of the second portion of the chewable arrangement. In some examples, the teething aid may be further configured to insert a portion of fabric in the second configuration, for example wherein inserting comprises receiving the portion of fabric in between the internal surface of the first portion and the internal surface of the second portion of the chewable arrangement.

In some examples, the teething aid further comprises a connecting portion, wherein the first portion and the second portion are coupled together by the connecting portion. The connecting portion may couple together at least a corner point of the first portion and a corner point of the second portion. In some examples, the connecting portion may couple together at least an edge of the first portion and an edge of the second portion. In some examples, the connecting portion comprises a hinge, for example, a connecting hinge, for example but not limited to a living hinge. However, the skilled person will understand other coupling configurations may be used, for example wherein the connecting portion comprises a concertinaed membrane coupling at least two edges of the first portion to at least two corresponding edges of the second portion. The connecting portion may be moulded into the chewable arrangement of the teething aid using the same material as the first portion and the second portion, for example a resilient material. However, the skilled person will understand that the connecting portion may be made from a different material to the first and second portion. This material may be, but is not limited to, a resilient material such as a food grade silicone rubber, medical grade silicone rubber, food grade thermoplastic elastomers, and/or medical grade thermoplastic elastomers, and/or a stiff material, for example a polymer material, such as plastic.

In some examples, the shape of the first portion is substantially the same as the shape of the second portion, reflected about the connecting portion. Wherein the connecting portion comprises a hinge, the chewable arrangement may be folded about the connecting portion such that an internal surface of the first portion is arranged opposite an internal surface of the second portion in the first configuration. Thus, in the first configuration, the portion of material may be clamped between the opposite internal surfaces of the first portion and the second portion of the chewable arrangement.

In some examples, the reversible fastening means may be configured to reversibly attach the chewable arrangement to a portion of fabric by reversibly securing the teething aid in the first configuration. In some examples, the reversible fastening means may comprise at least one clip. In some examples, the at least one clip may be arranged at an edge of the chewable arrangement; preferably, wherein the teething aid may comprise at least two clips arranged on different edges of the chewable arrangement. In some examples, the clip may comprise a hook portion and a dock portion, wherein the hook portion is configured to reversibly attach to the dock portion. The hook portion may be coupled to one of (i) the first portion or (ii) the second portion of the chewable arrangement, and the dock portion may be coupled to the other of (i) the first portion or (ii) the second portion of the chewable arrangement, such that the hook portion and the dock portion may be on opposite portions of the chewable arrangement and wherein the hook portion is configured to reversibly attach to the dock portion in the first configuration. In some examples, the hook portion may be coupled to the chewable arrangement by a hinge, for example a living hinge or connecting hinge; this may be advantageous to allow the hook to flex easily and repeatedly. However, the skilled person will understand that other clip configurations, or other suitable reversible fastening means may be used.

In some examples, the chewable arrangement may further comprise an external surface, wherein at least a portion of the external surface comprises moulded shapes configured to soothe and/or massage gums to stimulate teething. In some examples, the external surface of the chewable arrangement may comprise an external surface of the first portion and an external surface of the second portion of the chewable arrangement. The moulded shapes may comprise relief or protruding surface shapes. The moulded shapes may comprise at least one of ridges, triangles, circles, spheres, semi-circles, semi-spheres, undulating lines, chevrons, herringbones, or any other suitable shape. In some examples, at least a portion of the moulded shapes on the external surface comprise an arrangement of semi-spherical protrusions configured to hold teething gel. This may be advantageous to act as a gentle toothbrush for infants, configured to gently clean the gums and new teeth.

In some examples, the teething aid may further comprise at least one additional teething or chewable element, wherein the additional teething or chewable element is configured to extend from the chewable arrangement. This may be advantageous to increase the chewable surface area. The additional teething elements may also advantageously be configured to act as handle portions, configured to be easily gripped by an infant.

In some examples, the chewable arrangement may further comprise a gripping means, wherein the gripping means is configured to grip a portion of fabric. In some examples, the gripping means may be configured to provide an interlocking grip in the first configuration, for example wherein the gripping means comprises at least one male portion and at least one female portion, wherein each female portion is configured to receive a male portion to provide the interlocking grip. In some examples, the portion of fabric is configured to be gripped between the at least one male portion and the corresponding female portion of the gripping means in the first configuration. In some examples, the male portion may be arranged on one of (i) the internal surface of the first portion or (ii) the internal surface of the second portion of the chewable arrangement, and the female portion may be arranged on the other of (i) the first portion or (ii) the second portion of the chewable arrangement, such that the female portion is arranged on the opposite internal surface to the corresponding male portion. In some examples, the male portion comprises a protruding shape and the female portion comprises a corresponding recessed or indented shape, such that the female portion is configured to receive a male portion to provide the interlocking grip. In some examples, the male portion may be configured to provide a friction fit with the female portion; in other examples, the male portion is configured to have a tolerance to accommodate a portion of fabric within the interlocking grip. In some examples, the gripping means may comprise a plurality of protruding shapes and corresponding recessed or indented shapes, wherein the plurality of shapes may be the same or a combination of different shapes, for example, but not limited to, at least one of spigots, ridges, triangles, circles, semi-circles, straight lines, curved lines, undulating lines, chevron, herringbone, half sphere shapes, hooks and ledges. In some examples, the plurality of male portions may be arranged on one of (i) the internal surface of the first portion or (ii) the internal surface of the second portion of the chewable arrangement, and the plurality of female portions may be arranged on the other of (i) the first portion or (ii) the second portion of the chewable arrangement, such that the plurality of female portions are arranged on the opposite internal surface to the corresponding male portions; however, in other examples, the internal surface of the first portion and the internal surface of the second portion of the chewable arrangement may each comprise a combination of male and female portions, provided that each female portion is arranged on the opposite internal surface to a corresponding male portion.

In some examples, the first portion and the second portion of the chewable arrangement may each have a substantially triangular shape. A triangular shape may be advantageous such that the triangular shape of the first and second portions are configured to receive and reversibly attach to a corner of fabric in the first configuration. In some examples, the chewable arrangement may have a substantially hour-glass shape, for example wherein the first portion and the second portion of the chewable arrangement each have a substantially triangular shape and the connecting portion couples together a corner point of the first portion with a corner point of the second portion. However, the skilled person will understand this is merely one example, and the chewable arrangement may comprise any other shape, for example, but not limited to, wherein the first portion and the second portion of the chewable arrangement each have a substantially rhombus shape, coupled by the connecting portion at a corner point of the first portion and a corner point of the second portion; wherein the first portion and the second portion of the chewable arrangement each have a substantially circular shape, coupled by the connecting portion at a portion of the outer edge of the first and second portions; or any other shape, including wherein first portion and the second portion of the chewable arrangement each have a shape such as an animal, logo, character, third-party intellectual property, an object, or any other suitable shape.

In some examples, the chewable arrangement is formed at least in part from a resilient material. In some examples, the resilient material is formed at least in part from an elastomer, such as, but not limited to, food grade silicone rubber, medical grade silicone rubber, a food grade thermoplastic elastomer, or medical grade thermoplastic elastomer.

In some examples, the teething aid may be made of materials that are refrigerator- and/or freezer-safe, such that the teething aid may be configured to be placed in the refrigerator and/or freeze to cool the resilient material before use to produce a cooling and/or soothing effect in use. In some examples, at least a part of the chewable arrangement may be configured to contain a fluid, for example a liquid or gel, wherein the fluid is configured to be cooled or frozen before use, for example to provide a prolonged cooling effect on gums in use. In some examples, the teething aid may be at least one of waterproof, water-resistant, and/or dishwasher-safe, such that the teething aid may be configured to be cleaned after use.

In some examples, the chewable arrangement may comprise a support skeleton, or support structure, configured to provide rigidity and strength to the chewable arrangement, wherein the support skeleton is made of a stiffer material than the resilient material. This may be advantageous to prevent the teething aid from bending or bowing when in use. In some examples the support skeleton may be made of a non-pliable material, for example a stiff polymer. In some examples, the support skeleton provides a frame and/or backbone to support the resilient material. The support skeleton may be at least partially embedded, encapsulated and/or overmoulded in the resilient material. The support skeleton may form at least a portion of the internal surface of the chewable arrangement. The support skeleton may be bonded to the resilient portion of the chewable arrangement through chemical bonding, mechanical bonding and/or adhesive, such as glue, however the skilled person will understand that other bonding methods may be used, including, but not limited to, welding, an interference fit, friction fit, or snap-fit. In some examples, the support skeleton may be fully encapsulated in the resilient material.

In some examples, the support skeleton may further support and/or comprise the fastening means, for example wherein the fastening means may be made of the same stiffer material as the support skeleton. In some examples, the support skeleton may further support and/or comprise the gripping means, for example wherein the gripping means may be made of the same stiffer material as the support skeleton. In some examples, the support skeleton may further support and/or comprise the connecting portion, for example the hinge, for example wherein the connecting portion and/or hinge may be made of the same stiffer material as the support skeleton. In examples wherein the support skeleton is at least partially encapsulated or overmoulded in the resilient material, the gripping means, fastening means, and/or connecting portion may be fully overmoulded or encapsulated in the resilient material, partially overmoulded or encapsulated in the resilient material, or exposed.

In some examples, the gripping means may be made at least in part by another material, separate from the stiff material of the support skeleton. For example, the gripping means material may be formed at least in part from food grade silicone rubber, medical grade silicone rubber, food grade thermoplastic elastomers, and/or medical grade thermoplastic elastomers. Alternatively, the gripping means may be made from a polymer, such as plastic.

In some examples, the fastening means may be made at least in part by another material, separate from the stiff material of the support skeleton. For example, the fastening means material may be formed at least in part from food grade silicone rubber, medical grade silicone rubber, food grade thermoplastic elastomers, and/or medical grade thermoplastic elastomers. Alternatively, the fastening means may be made from a polymer, such as plastic.

In a second aspect of the invention there is provided a teething aid comprising a chewable arrangement having a substantially triangular shape, for example when attached to a portion of fabric. The chewable arrangement may be configured to attach to a corner of a fabric, such that a first corner of the triangular chewable arrangement substantially corresponds to the corner of the fabric. The chewable arrangement further comprises a plurality of semi-spherical protrusions arranged on an external surface of the chewable arrangement. The plurality of semi-spherical protrusions are configured to hold teething gel. In some examples, the plurality of semi-spherical protrusions are arranged at the first corner of the chewable arrangement. In some examples, regions of the semi-spherical protrusions may be located in other areas of the external surface of the chewable arrangement, instead of or in addition to a region arranged at the first corner.

In some examples, the chewable arrangement may also be configured to detach from the fabric, such that the chewable arrangement may be reversibly attached.

In some examples, each semi-spherical protrusion may have a diameter, D, wherein the spacing between any two adjacent semi-spherical protrusions is equal to or less than D. Preferably, the spacing between adjacent protrusions is less than D.

In some examples, each semi-spherical protrusion may have a protrusion height, H, from the external surface of the chewable arrangement. In some examples, H may be equal to or less than twice the diameter D (2D).

The plurality of semi-spherical protrusions may be arranged in a plurality of rows, for example wherein the rows extend transversely or longitudinally across at least a portion of the external surface of the chewable arrangement, for example at the first corner. In some examples, each row may align the semi-spherical protrusions into perpendicular columns; in other examples, the alignment of semi-spherical protrusions may be staggered, for example as a half repeat pattern.

In some examples the teething aid may further comprise at least a second region of protrusions wherein the second region of protrusions have at least one of (i) greater spacing than the plurality of semi-spherical protrusions of the first region, and (ii) greater size and/or diameter than each of the semi-spherical protrusions of the first region. The second region of protrusions may also have a greater or reduced protruding height compared to the semi-spherical protrusions of the first region. The second region of protrusions may be configured to soothe and/or massage gums to stimulate teething. In some examples, the protrusions may comprise relief surface shapes. The surface shapes may comprise at least one of ridges, triangles, circles, spheres, semi-circles, semi-spheres, undulating lines, chevrons, herringbones, or any other suitable shape. In some examples, the teething aid may further comprise a plurality of different regions or zones of the chewable arrangement, wherein each region or zone comprises a different configuration of protrusions. For example, wherein each configuration of protrusion comprises at least one of (i) a different shape of protrusion, (ii) a different combination of shaped protrusions, (iii) different spacing of protrusions, (iv) different arrangement of protrusions, (v) different size or diameter of protrusions, and/or (vi) different heights of protrusions.

The above description details the use of the teething aid of the present invention by infants, however the skilled person will understand the teething aid is not designed for use solely with infants, but may also benefit those with special needs or disabilities.

DRAWINGS

Embodiments of the disclosure will now be described, by way of example only, with reference to the accompanying drawings, in which.

SPECIFIC DESCRIPTION

Embodiments of the claims relate to a teething aid configured to reversibly attach and detach to a portion of fabric, for example to a bib, blanket, muslin or lovey.

It will be appreciated from the discussion above that the embodiments shown in the Figures are merely exemplary, and include features which may be generalised, removed or replaced as described herein and as set out in the claims.

Figure 1:
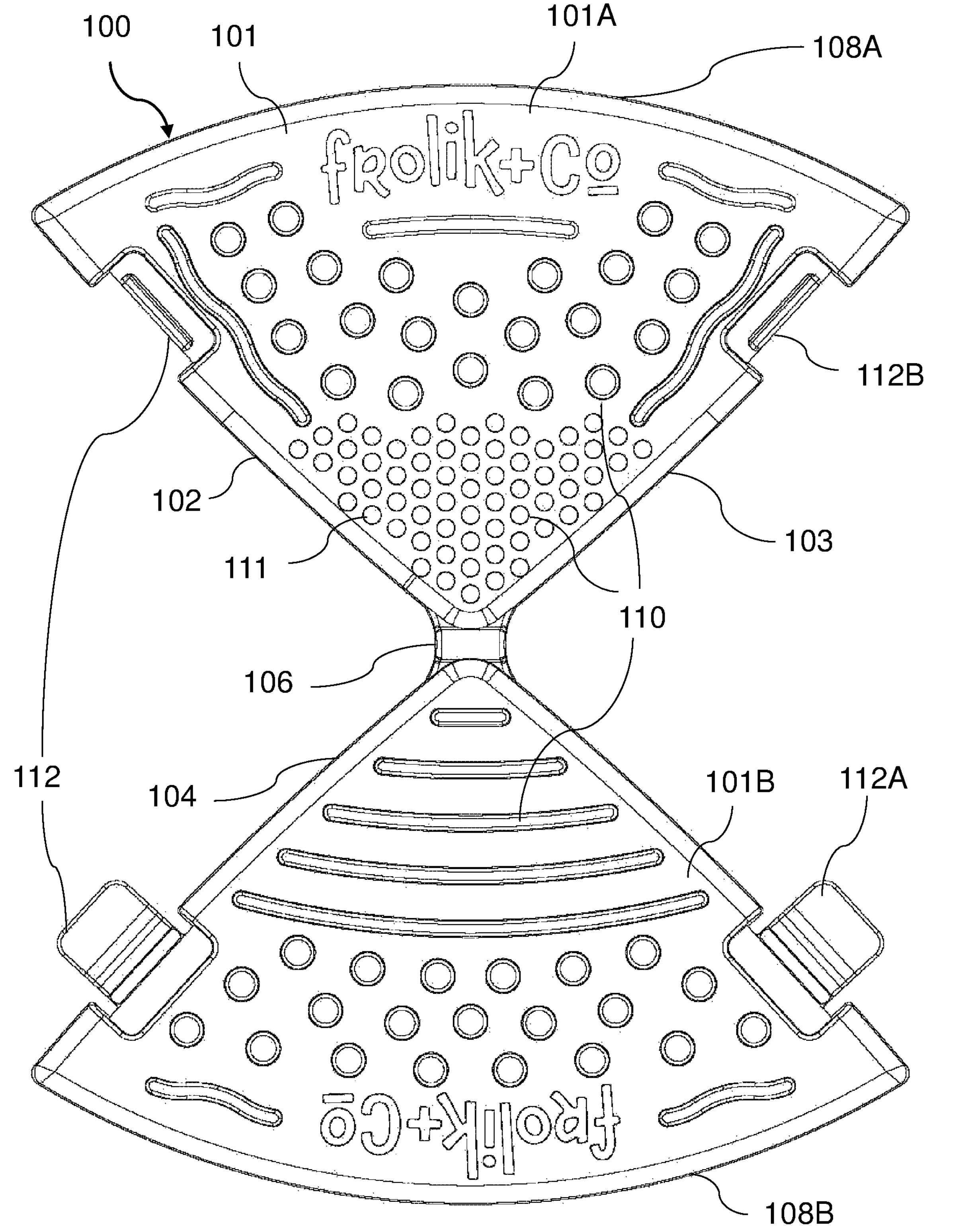
FIG. 1 shows an example teething aid of the present invention.

FIG. 1 shows an example teething aid 100 comprising a chewable arrangement 103, in an open configuration, for example a second configuration. The chewable arrangement 103 comprises a first portion 102, a second portion 104, and a connecting portion 106, wherein the first portion 102 and the second portion 104 are coupled together by the connecting portion 106. The first portion 102 and the second portion 104 are substantially triangular in shape. The connecting portion 106 couples together a corner point of the first portion 102 and a corner point of the second portion 104 via a short convex-shaped portion. In this example, the shape of the first portion 102 is substantially the same as the shape of the second portion 104 reflected about the connecting portion 106. As such, the chewable arrangement 103 comprises a substantially hour-glass shape when opened up flat, in a fully open configuration. The substantially hour-glass shape comprises curved top and bottom edges 108A and 108B, wherein the curved top and bottom edges 108A and 108B are edges of the first portion 102 and the second portion 104 respectively, opposite to the connecting portion 106. Whilst in the example shown in FIGS. 1 and 2, the first portion 102 of the chewable arrangement 103 is displaced 180 degrees from the second portion 104 in the second configuration, giving rise to the substantially hour-glass shape, the skilled person will understand that this is merely an example and the first portion 102 of the chewable arrangement 103 may be displaced less than 180 degrees and/or more than 180 degrees from the second portion 104 in the open, or second, configuration.

The chewable arrangement 103 further comprises a plurality of protrusions (or "moulded shapes") 110 on the surface 101, including the surface 101A of the first portion 102 and the surface 101B of the second portion 104. The moulded shapes comprise a range of different shapes, including, but not limited to, circles, semi-spherical protrusions, curved lines and undulating lines. In this example, the moulded shapes 110 comprise at least a region comprising a plurality of semi-spherical protrusions 111, preferably the region of semi-spherical protrusions is proximal to the edge of at least one of the first or second portions 102 ad 104. In this example, a region of semi-spherical protrusions is arranged proximal to the apex of the connected corner point of the first portion 102. An example region of semi-spherical protrusions 111 is shown in more detail in FIG. 8.

The chewable arrangement 103 comprises a plurality of regions, wherein each region or zone comprises a different configuration of moulded shapes. For example, wherein each configuration of protrusion comprises at least one of (i) a different shape of protrusion, (ii) a different combination of shaped protrusions, (iii) different spacing of protrusions, (iv) different arrangement of protrusions, (v) different size or diameter of protrusions, and/or (vi) different heights of protrusions. The second portion 104 may comprise different regions and configurations of moulded shapes 110 relative to the first portion 102.

The teething aid 100 further comprises a fastening means 112, in this example a pair of clips. In this example, each clip 112 comprises a hook 112A and a dock 112B. The hook 112A and the dock 112B are located on opposite portions 102 and 104 of the chewable arrangement. In this example, the hooks 112A are located on opposite edges of the second portion 104 and the corresponding docks 112 are located on opposite edges of the first portion 102. However, the skilled person will understand that other configurations of fastening means 112 may be used, for example a hook 112A may be located on the first portion 102 and the corresponding dock 112 may be located on the second portion 104.

The plurality of moulded shapes 110 are configured to augment the gums during use, for example wherein the moulded shapes 110 are configured to stimulate teething, and massage and soothe the gums. The plurality of semi-spherical protrusions 111 are configured to hold teething gel, for example a dose of teething gel. The assembly of semi spherical protrusions 111 may be configured to hold teething gel as a result of the spacing between semi-spherical protrusions being significantly less than the circumference of the protrusions, and/or the height of the semi-spherical protrusions being significantly more than the spacing between the protrusions.

Figure 3A:
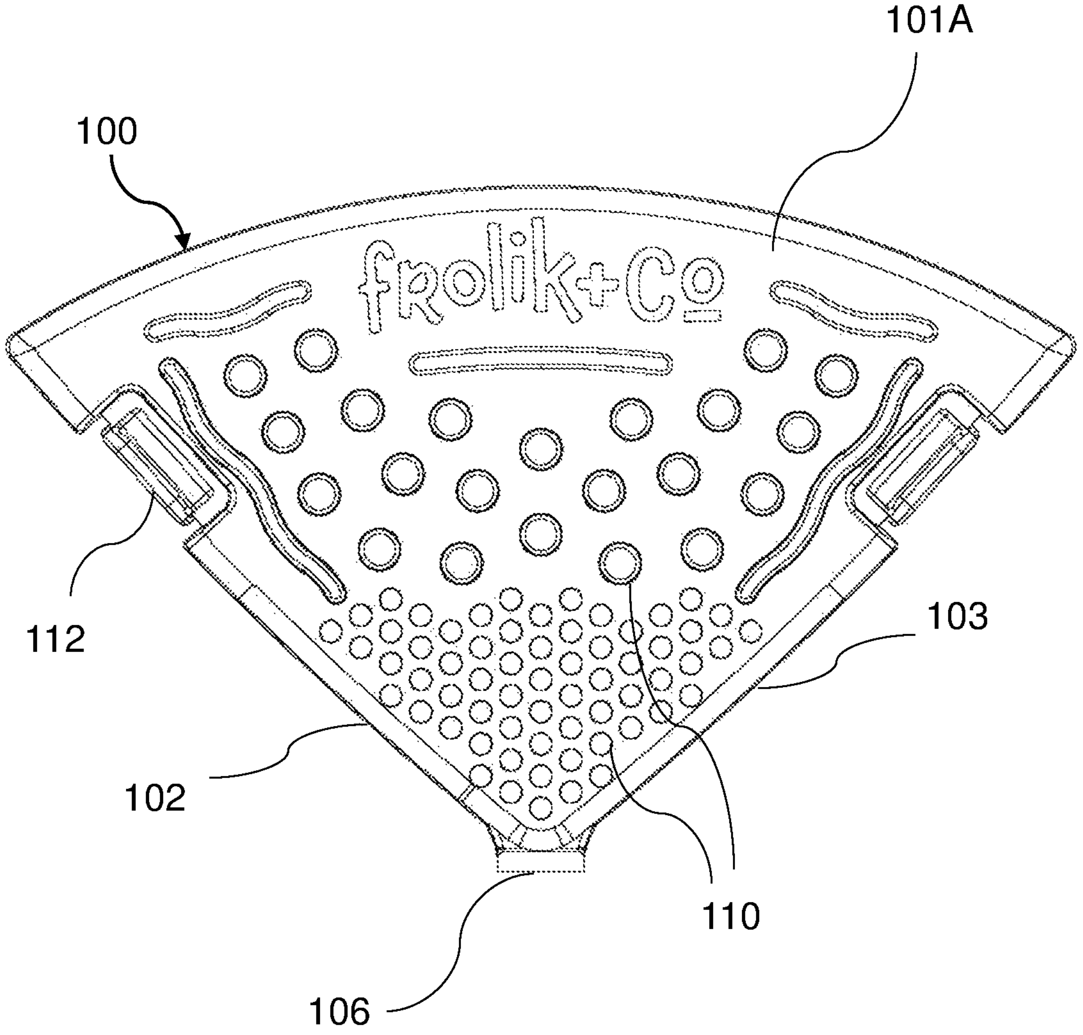
FIGS. 3A and 3B show the example teething aid of FIGS. 1 and 2 in a first configuration.
Figure 3B:
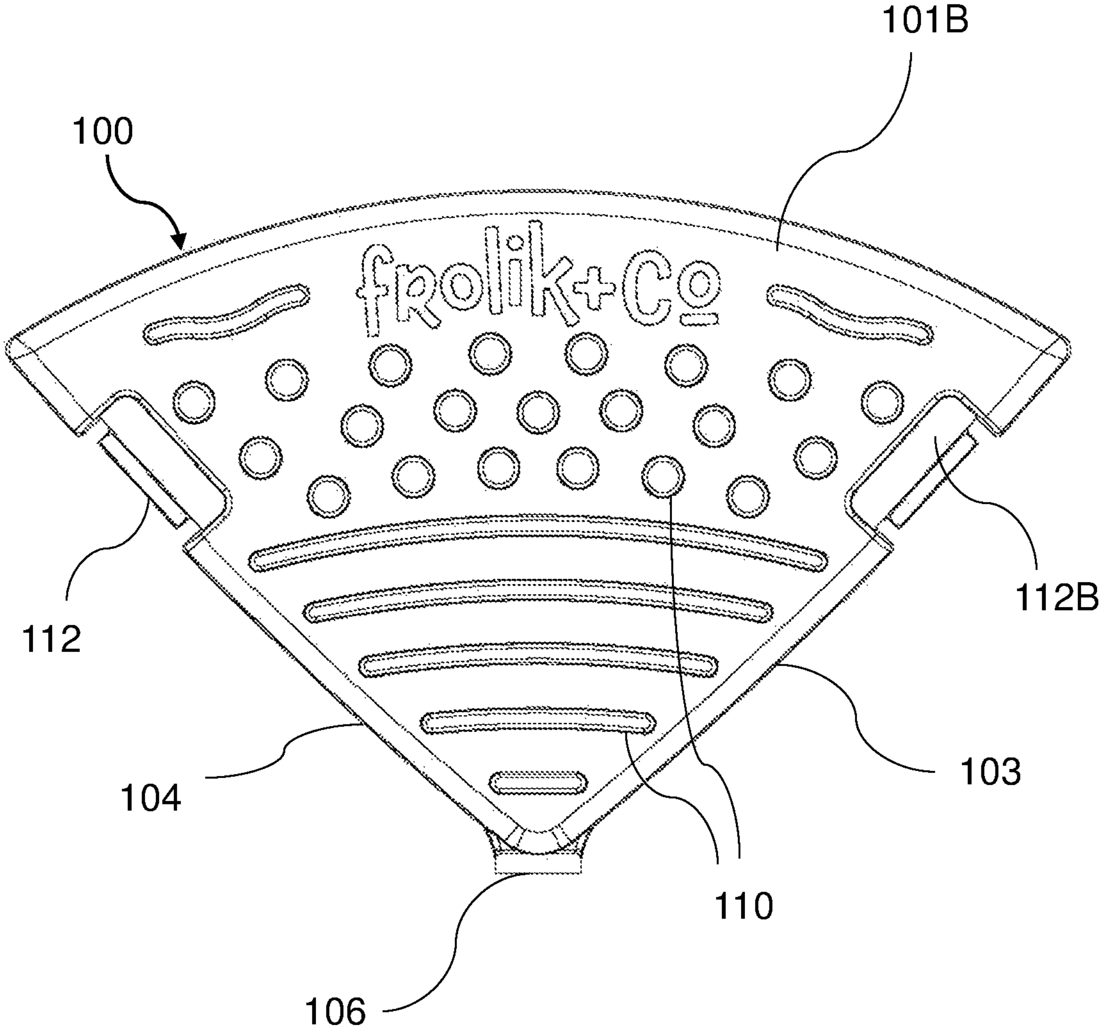

Each hook 112A is configured to couple to a corresponding dock 112B such that the clip 112 is reversible secured in a closed position, for example as shown in FIGS. 3A and 3B. The clip 112 is configured to reversibly secure the chewable arrangement 103 in a first configuration, wherein the first configuration is shown in more detail in FIGS. 3A and 3B.

Figure 2:
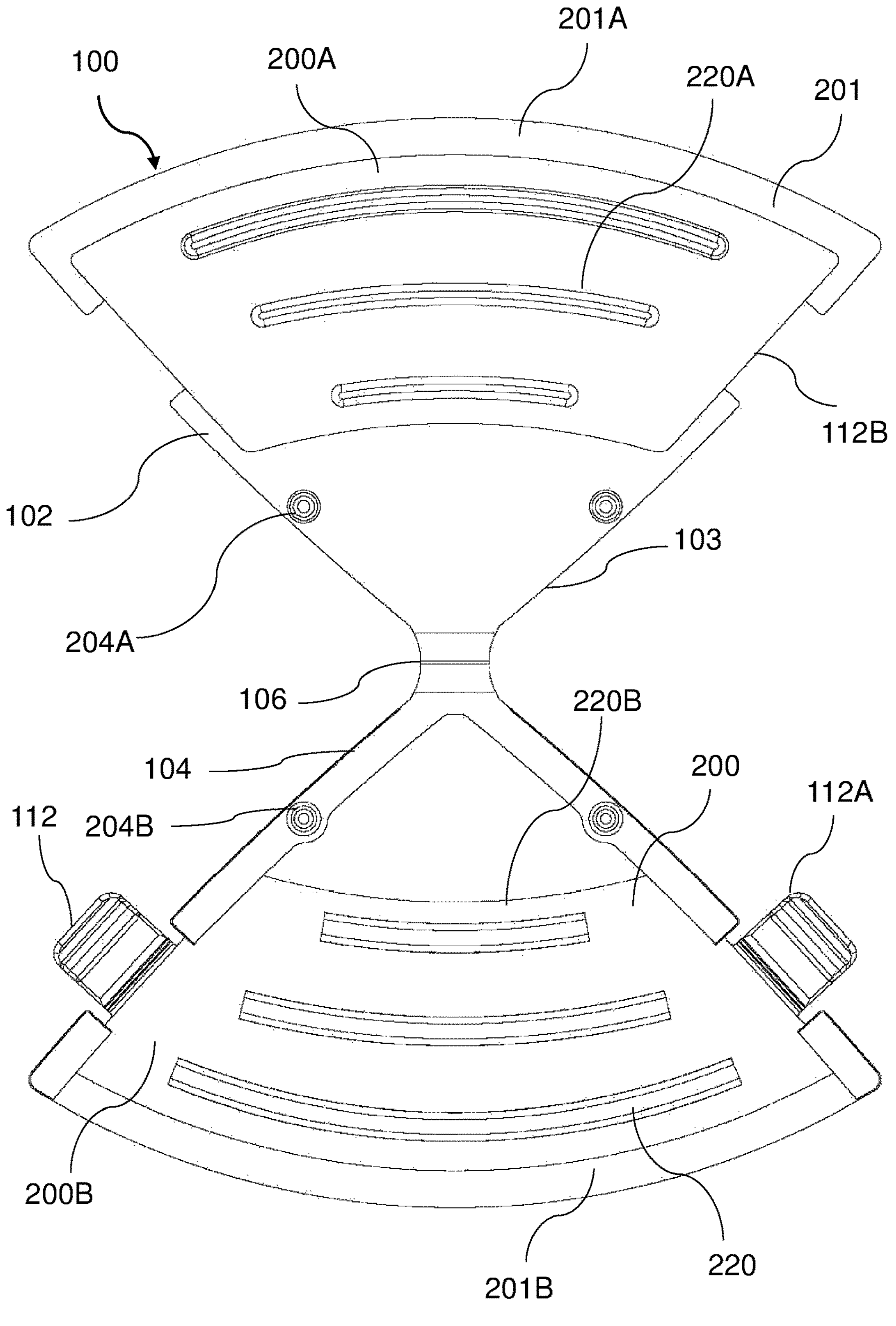
FIG. 2 shows an opposite surface of the example teething aid of FIG. 1.

FIG. 1 shows a first surface 101 of the example teething aid 100. FIG. 2 shows a second surface 201 of the example teething aid 100 shown in FIG. 1, wherein the second surface 201 is the reverse of the first surface 101.

The chewable arrangement 103 is formed at least in part by a resilient material, for example a pliable material, for example an elastomer, for example a food grade or medical grade silicone rubber, and/or a food grade or medical grade thermoplastic elastomer. In this example, a portion of the chewable arrangement 103 is made of a food grade thermoplastic elastomer.

The chewable arrangement 103 further comprises at least one alignment structure. In this example, each alignment structure comprises an alignment protrusion 204A and an alignment aperture 204B, wherein the alignment protrusion 204A and the corresponding alignment aperture 204B are arranged on opposite portions 102 and 104 of the chewable arrangement, such that the alignment protrusion 204A may be received by the alignment aperture 204B in the first configuration, as shown in FIG. 2. In this example, the chewable arrangement 103 comprises two alignment structures, arranged on opposite edges of the chewable arrangement 103. The alignment protrusions 204A are arranged on opposite edges of the first portion 102 of the chewable arrangement 103, and the alignment apertures 204B are arranged on opposite edges of the second portion 104.

The chewable arrangement 103 further comprises a support structure or support skeleton 200. In this example, the support structure 200 comprises a first portion 200A coupled to the first portion 102 of the chewable arrangement 103, and a second portion 200B coupled to the second portion 104 of the chewable arrangement 103, as shown in FIG. 2. The support structure 200 is formed of a non-pliable material, for example a non-pliable polymer or plastic, for example but not limited to polypropylene. In this example, the support structure 200 is coupled, for example bonded, to the chewable arrangement 103 by chemical bonding however the skilled person will understand any other suitable bonding methods may also be used, for example adhesive, or mechanical bonding, such as welding, an interference fit, friction fit, or snap-fit. The support structure 200 forms at least a portion of the second surface 201 of the chewable arrangement 103. The support structure 200 is also partially embedded in the resilient material, such that the resilient material is overmoulded over the first surface 101 of the support structure 200. However, the skilled person will understand that is some examples the support structure 200 may be fully embedded, or fully overmoulded, in the resilient material.

Each portion of the support structure 200A and 200B comprises a substantially curved substrate, wherein the substrate is flat in a plane parallel to the plane of the chewable arrangement 103, but having a curvature in the plane, for example wherein the arc of the curved substrate is concentric with the curved top and bottom edges 108A and 108B of the first and second portions 102 and 104 of the chewable arrangement 103.

The support structure 200 further comprises a gripping means 220, wherein the gripping means 220 comprises at least one protruding structure 220A on the internal surface 201 of one portion of the chewable arrangement 103, for example surface 201A the first portion 102, and at least one corresponding recessed or indented structure 220B on the internal surface 201 of the opposite portion, for example surface 201B the second portion 104. In this example, the gripping means comprises three pairs of protruding and recessed structures 220A and 220B, wherein the protruding and recessed structures 220A and 220B are long curved bars. The curvature of each bar is concentric with the curvature of the top and bottom edges 108A and 108B of the first and second portions 102 and 104 of the chewable arrangement and the curved substrates of the support structure 200A and 200B. However, the skilled person will understand that other structures having particular shapes may be used, including but not limited to at least one of: spigots, ridges, triangles, circles, semi-circles, undulating lines, chevron, herringbone, half sphere shapes, hooks and ledges.

In this example, the support structure 200 comprises the fastening means 112, such that the hooks 112A and docks 112B are integrated into the support structure 200. In this example, the fastening means 112 is made of the same material as the support structure, for example a stiffer material than the resilient material, such as a polymer or plastic. Each hook 112A comprises a hinge, for example a connecting hinge, for example a living hinge, configured to allow the hook to flex and bend relative to the support structure 200.

The first surface 101 shown in FIG. 1 is configured to be the external surface. The second surface 201 shown in FIG. 2 is configured to be the internal surface.

The resilient, pliable portion of the chewable arrangement 103 is configured to be chewed in use.

The alignment protrusion 204A is configured to be received by the alignment aperture 204B in the first configuration. This may be advantageous to align the first portion 102 and the second portion 104 of the chewable arrangement 103 in the first configuration, shown in more detail in FIG. 2. This may be advantageous to ensure the clips 112 are able to engage in order to reversibly secure the teething aid 100 in the first configuration.

The support structure 200 is configured to provide rigidity and strength to at least a portion of the chewable arrangement 103. However, the support structure 200 may also be suitable for chewing in use.

The gripping means 220 is configured to grip a portion of fabric in the first configuration, wherein the first configuration is shown in FIGS. 3A and 3B. Each protruding shape 220A of the gripping means 220 is configured to mate with the corresponding recessed shape 220B in the first configuration to create an interlocking grip.

FIGS. 3A and 3B show the teething aid 100 of FIGS. 1 and 2. Whilst FIGS. 1 and 2 show the teething aid 100 in an open configuration, for example the second configuration, FIGS. 3A and 3B show the teething aid 100 in a closed configuration, for example the first configuration. FIG. 3A shows a first side, for example the front side, comprising the external surface 101A of the first portion 102; whereas 3B shows a second side, for example the back side, comprising the external surface 101B of the second portion 104.

In the first configuration, the chewable arrangement 103 is folded about the connecting portion 106 such that an internal surface 201A of the first portion 102 is arranged opposite an internal surface 201B of the second portion 104. The external surface 101 of the chewable arrangement 103 is outwards facing. In this example, the connecting portion 106 comprises a hinge, such that the connecting portion 106 may facilitate the teething aid 100 to be folded in half. In this example, the hinge is a living hinge, wherein the living hinge is made from a flexible material, for example the resilient material of the chewable arrangement 103. However, the skilled person will understand that other hinge configurations may be used, for example, but not limited to, a connecting hinge and/or where the hinge is integrated in the support structure 200.

The chewable arrangement 103 is reversibly secured in the first configuration by the clips 112 which are in the closed position, such that the hooks 112A are engaged with the corresponding docks 112B.

In the first configuration, the chewable arrangement 103 is configured to clamp a portion of fabric between the internal surface 201A of the first portion 102 and the internal surface 201B of the second portion 104 of the chewable arrangement 103. In the second configuration, the chewable arrangement 103 may be configured to detach from the portion of fabric, such that the portion of fabric is unclamped from between the first portion 102 and the second portion 104 of the chewable arrangement by displacing the internal surface 201A of the first portion 102 of the chewable arrangement relative to the internal surface 201B of the second portion 104 of the chewable arrangement 103, for example as shown in FIGS. 1 and 2. The teething aid 100 may be further configured to insert a portion of fabric in the second configuration. In the examples shown in FIGS. 1 and 2, the first portion 102 of the chewable arrangement 103 is displaced 180 degrees from the second portion 104 in the second configuration. However, the skilled person will understand that this is merely an example and that in other examples the first portion 102 of the chewable arrangement 103 may be displaced less than 180 degrees and/or more than 180 degrees from the second portion 104 in the second configuration.

Figure 4:
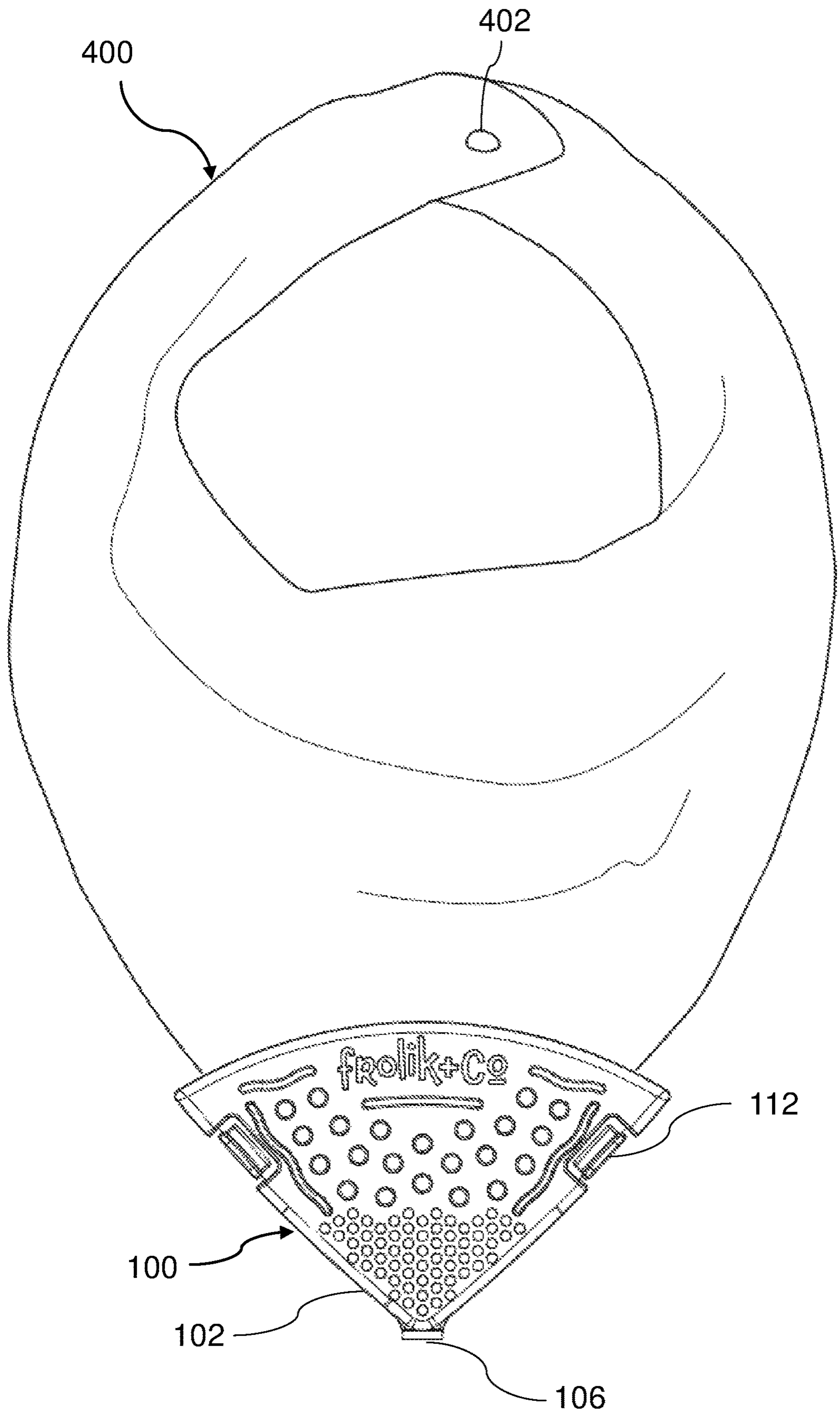
FIG. 4 shows the example teething aid of FIGS. 1 to 3 in use, attached to a bib.

FIG. 4 shows the teething aid 100 in use, wherein the teething aid 100 is reversibly attached to a portion of fabric 400 in the first configuration. Preferably, the teething aid 100 may be attached to a corner of fabric 400. In the example shown, the portion of fabric 400 is a bandana bib. The bandana bib shown further comprises a fastening means 402 configured to reversibly attach the bandana bib around the neck of an infant.

In use, the fastening means 112 may be reversibly uncoupled and the chewable arrangement 103 is transitioned into the second configuration. The soiled, wet portion of fabric may then be removed. A second portion of fabric may then be inserted between the internal surfaces 201A and 201B of the first portion 102 and the second portion 104 of the chewable arrangement 103, and reversibly attached to the teething aid 100 by transitioning the teething aid into the first configuration and reversibly securing the fastening means 112.

FIG. 4 shows attachment to a bandanna bib, however the skilled person will understand the teething aid 100 can similarly be attached to any other portion of fabric, including, but not limited to, a blanket, muslin or lovey. Similarly, the above description details the use of the teething aid 100 by infants, however the skilled person will understand the teething aid 100 is not designed for use solely with infants, but may also benefit those with special needs or disabilities.

Figure 5A:
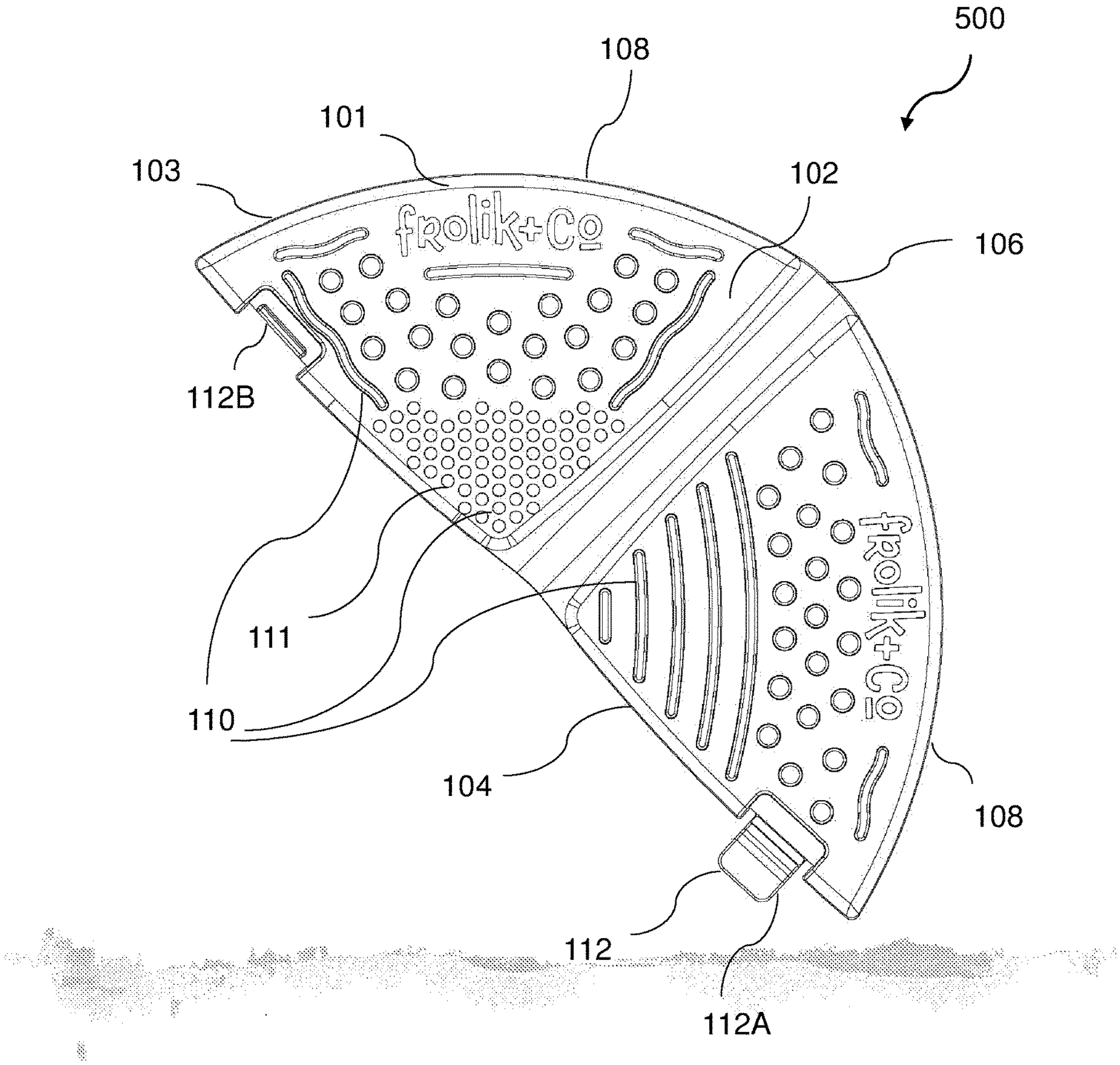
FIGS. 5A to 5C show an alternative example design for the teething aid of the present invention.

FIG. 5A shows the external surface 101 of an alternative teething aid 500. The teething aid 500 comprises a chewable arrangement 103, in an open configuration, for example a second configuration. Similarly to the teething aid 100 of FIGS. 1 to 4, the chewable arrangement 103 comprises a first portion 102, a second portion 104, and a connecting portion 106, wherein the first portion 102 and the second portion 104 are coupled together by the connecting portion 106. The first portion 102 and the second portion 104 are substantially triangular in shape, each comprising a curved top edge 108. However, in the example shown in FIG. 5, the connecting portion 106 couples together an edge of the first portion 102 and an edge of the second portion 104 via a rectangular hinge portion that runs down the entire length of the edge of the first portion 102 and the coupled edge of the second portion 104, for example like the spine of a book. In this example, the connecting portion comprises a living hinge, however the skilled person will understand that other hinge configurations may be used, for example but not limited to a connecting hinge. The shape of the first portion 102 is substantially the same as the shape of the second portion 104 reflected about the connecting portion 106. As such, in this example, the chewable arrangement 103 comprises a substantially semi-circular shape when opened up flat, in a fully open configuration, wherein the curved edge of the substantially semi-circular shape arises from the curved top edges 108 of the first and second portions 102 and 104.

The chewable arrangement 103 further comprises a plurality of moulded shapes 110 on the surface 101. The moulded shapes comprise a range of different shapes, including, but not limited to, circles, semi-spherical protrusions, curved lines and undulating lines. In this example, the moulded shapes 110 comprise at least a region comprising a plurality of semi-spherical protrusions 111, preferably wherein the region of semi-spherical protrusions is arranged at an apex corner point of the first portion 102.

The teething aid 500 further comprises a fastening means 112, in this example a clip. In this example, the comprises a hook 112A and a dock 112B. The hook 112A and the dock 112B are located on opposite portions 102 and 104 of the chewable arrangement 103. In this example, the hook 112A is located on the edge of the second portion 104 opposite to the connecting portion 106 and the corresponding dock 112B is located on the edge of the first portion 102 opposite to the connecting portion 106. However, the skilled person will understand that other configurations of fastening means 112 may be used, for example a hook 112A may be located on the first portion 102 and the corresponding dock 112 may be located on the second portion 104. The teething aid 500 may also comprise a plurality of clips.

Figure 5B:
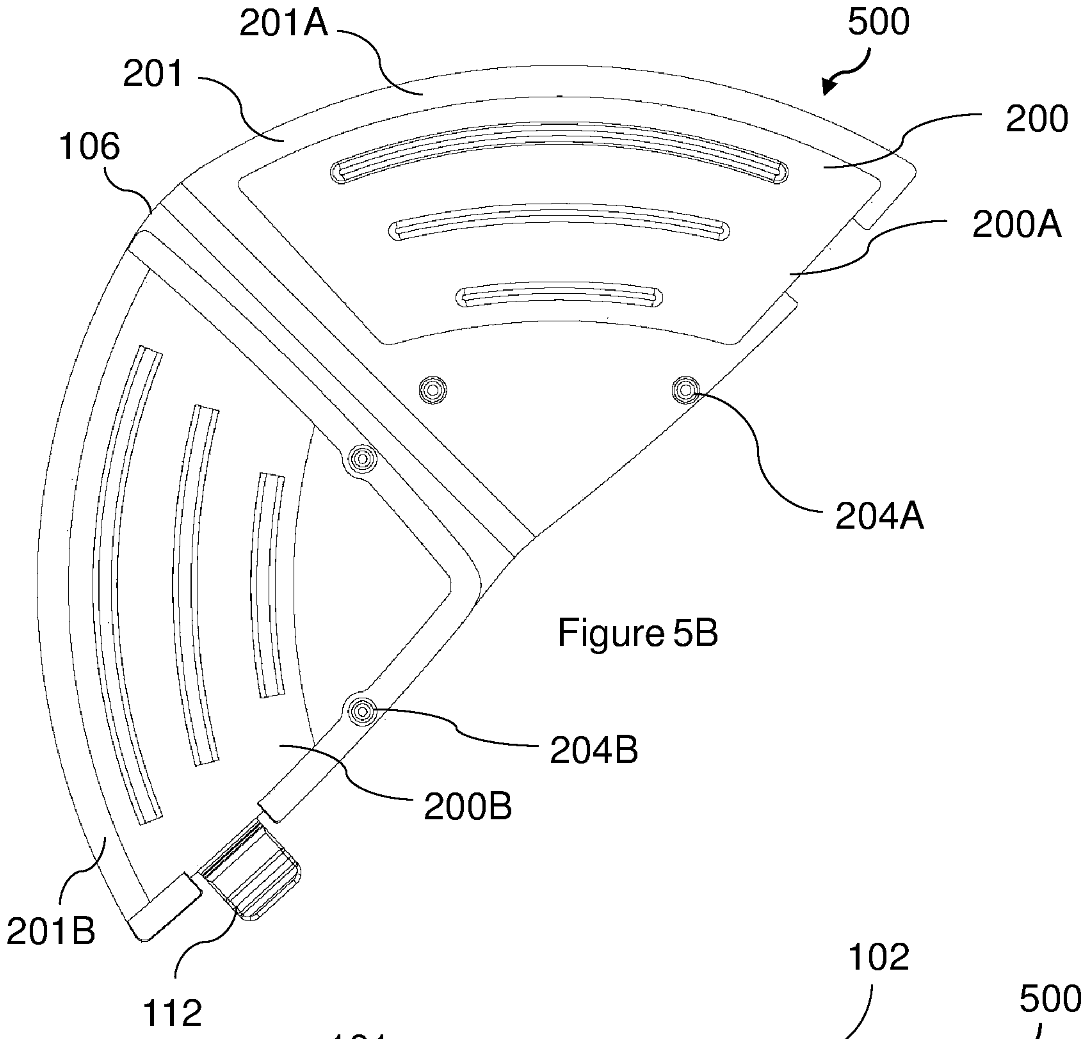

The reverse surface or internal surface 201 of the teething aid 500, as shown in FIG. 5B, may comprise a support structure 200, similar to the support structure 200 shown in FIG. 2, wherein the first portion 102 and the second portion 104 each comprise a support substrate, 200A and 200B respectively. Similarly, the support structure may also comprise a gripping means configured to grip a portion of fabric between the internal surfaces 201A of the first portion 102 and 201B of the second portion 104, such as the gripping means 220, similar to that shown in FIG. 2. The fastening means 112 may also be coupled to the support structure 200.

Figure 5C:
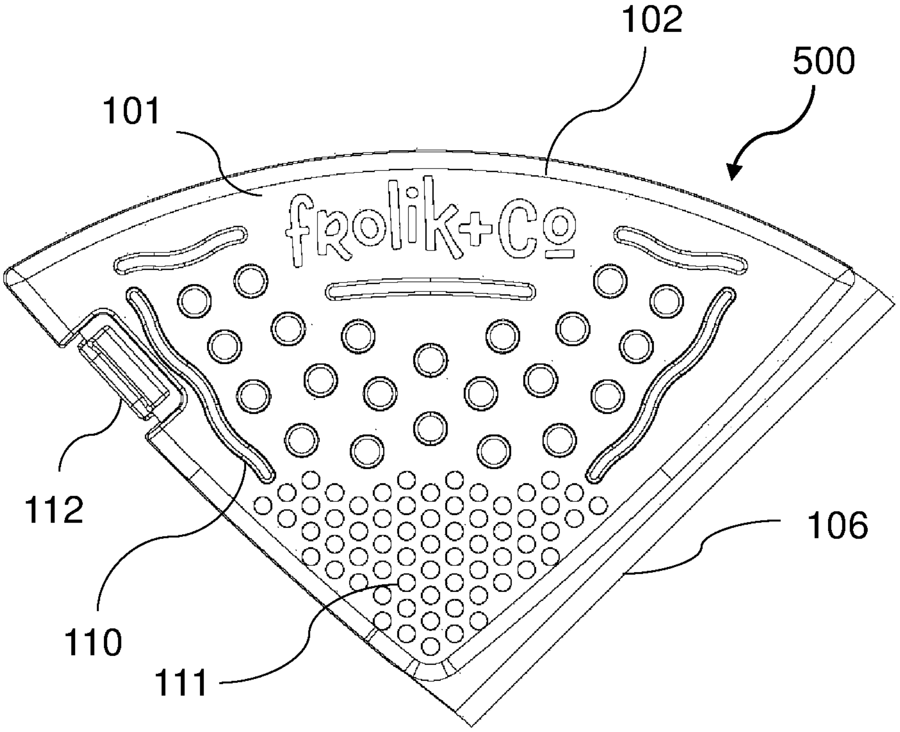

In the closed configuration, for example a first configuration as shown in FIG. 5C, the chewable arrangement 103 is folded about the connecting portion 106, like a book, such that an internal surface 201A of the first portion 102 is arranged opposite an internal surface 201B of the second portion 104. The external surface 101 of the chewable arrangement 103 is outwards facing. In this example, the connecting portion 106 comprises a hinge, such that the connecting portion 106 may facilitate the teething aid 100 to be folded in half.

In this example, the connecting portion 106 is made of the same material as the first and second portion, for example a resilient material, such as a silicone rubber or thermoplastic elastomer. The hinge may be a living hinge, wherein the living hinge is made from a flexible material, for example the resilient material of the chewable arrangement 103. However, the skilled person will understand that other hinge configurations may be used, for example, but not limited to where the hinge is a connecting hinge, where the hinge may be made from the same material as the support structure, and/or wherein the hinge is integrated in the support structure 200.

The chewable arrangement 103 is reversibly secured in the first configuration by the clip 112, such that the hook 112A engages with the corresponding dock 112B.

Figure 6A:
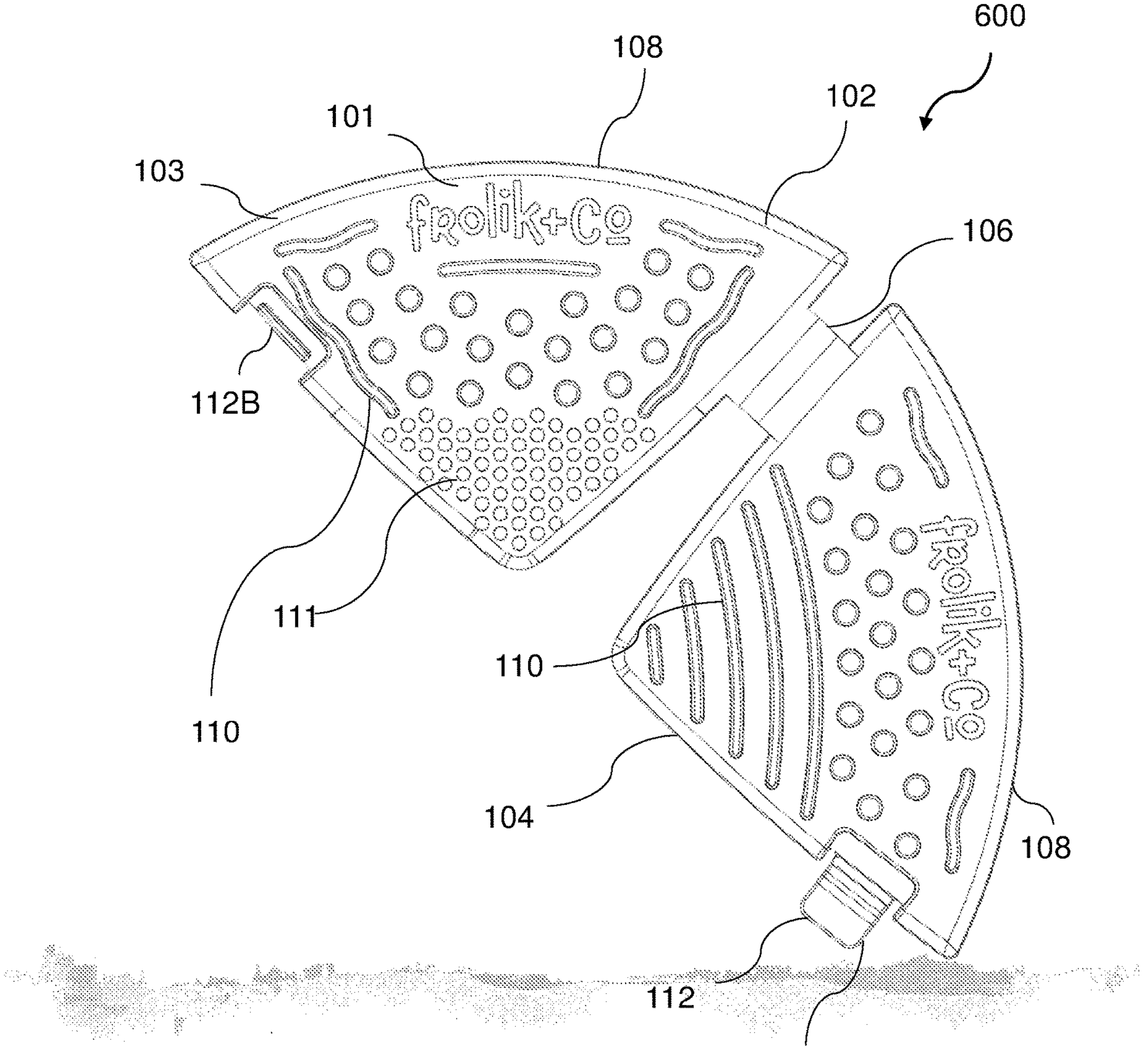
FIGS. 6A to 6C show another alternative example design for the teething aid of the present invention.
Figure 6B:
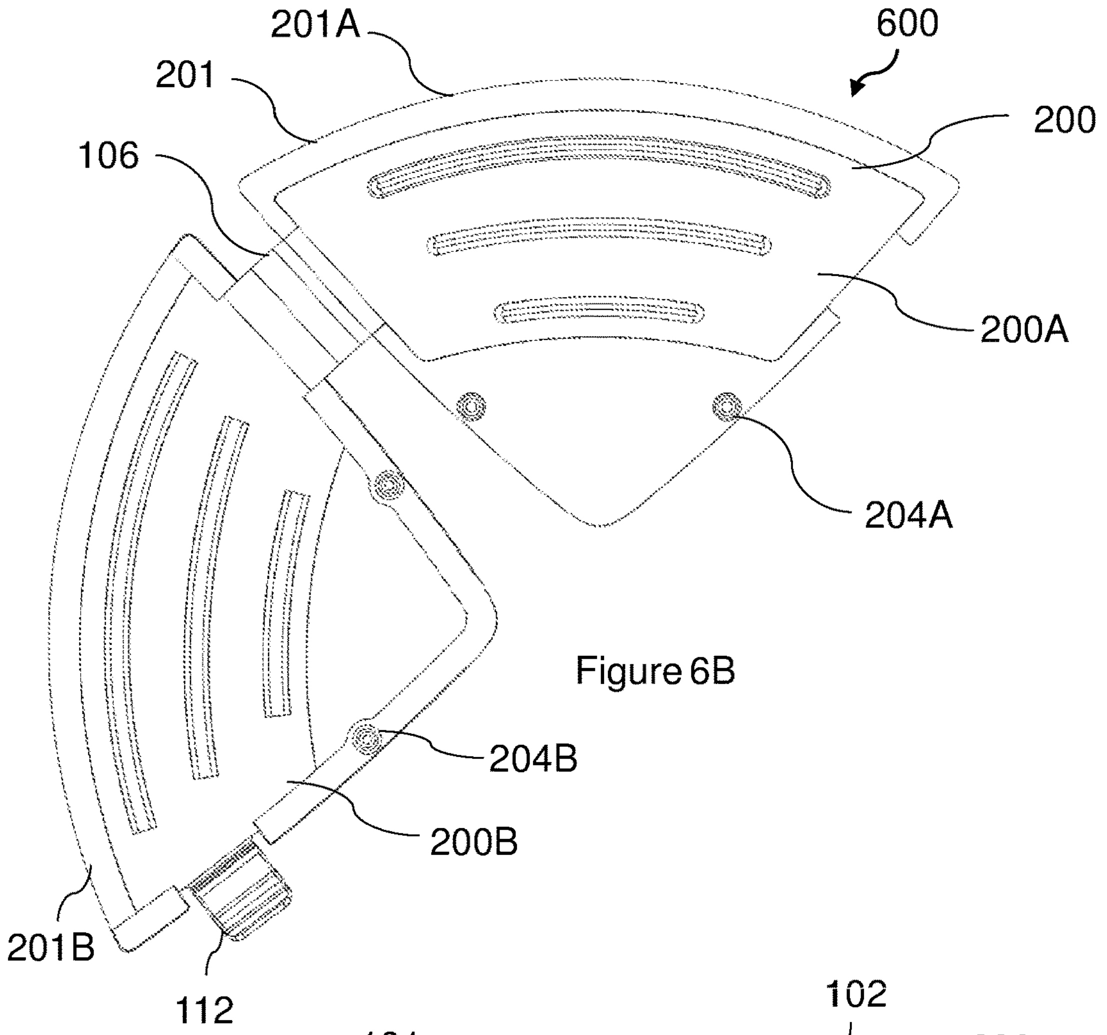
Figure 6C:
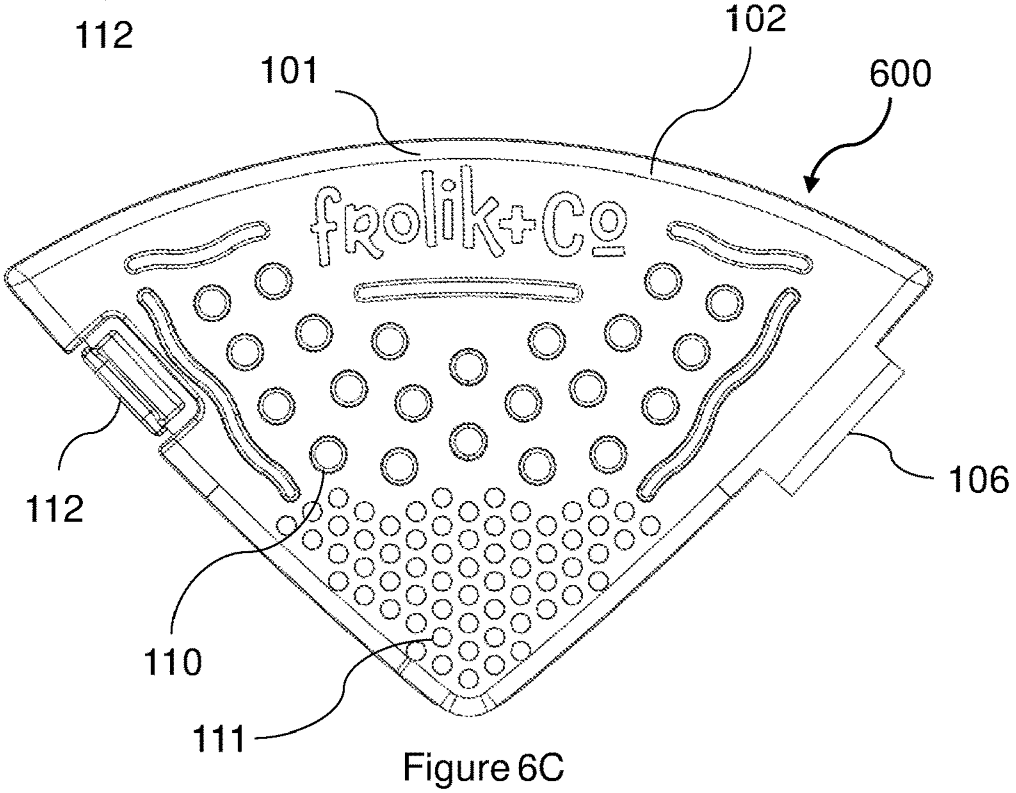

FIGS. 6A to 6C show another alternative teething aid 600. The teething aid 600 may be the same as the teething aid 500 in all material respects, however the teething aid 600 comprises a different configuration of the connection portion 106. In the example shown in FIG. 6A, the connecting portion 106 couples together an edge of the first portion 102 and an edge of the second portion 104 via a substantially rectangular hinge portion that couples a portion of the edge of the first portion 102 to a portion of the coupled edge of the second portion 104.

In this example, the connecting portion 106 is made of the same material as the support structure 200, for example a stiff material, such as a polymer or plastic. In this example, the connecting portion 106 is integrated into the support structure 200, such that the connecting portion 106 couples together the support substrates 200A and 200B, as seen in FIG. 6B. In this example, the connecting portion comprises a living hinge, however the skilled person will understand other hinge configurations may be used, for example but not limited to, a connecting hinge.

Figure 7A:
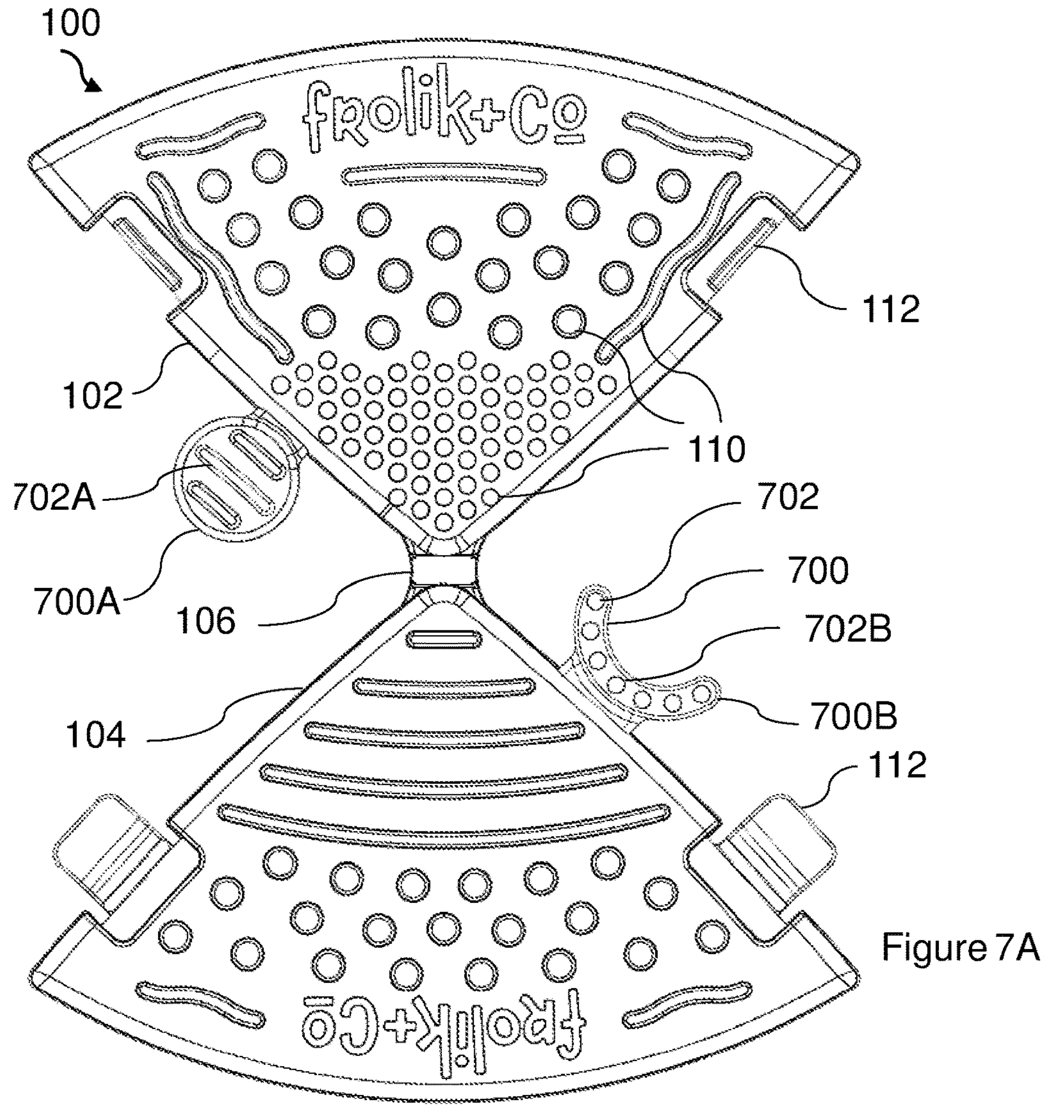
FIGS. 7A and 7B shows an example teething aid of the present invention, for example the teething aid of FIGS. 1 to 4, wherein the teething aid comprises additional chewable teething elements.
Figure 7B:
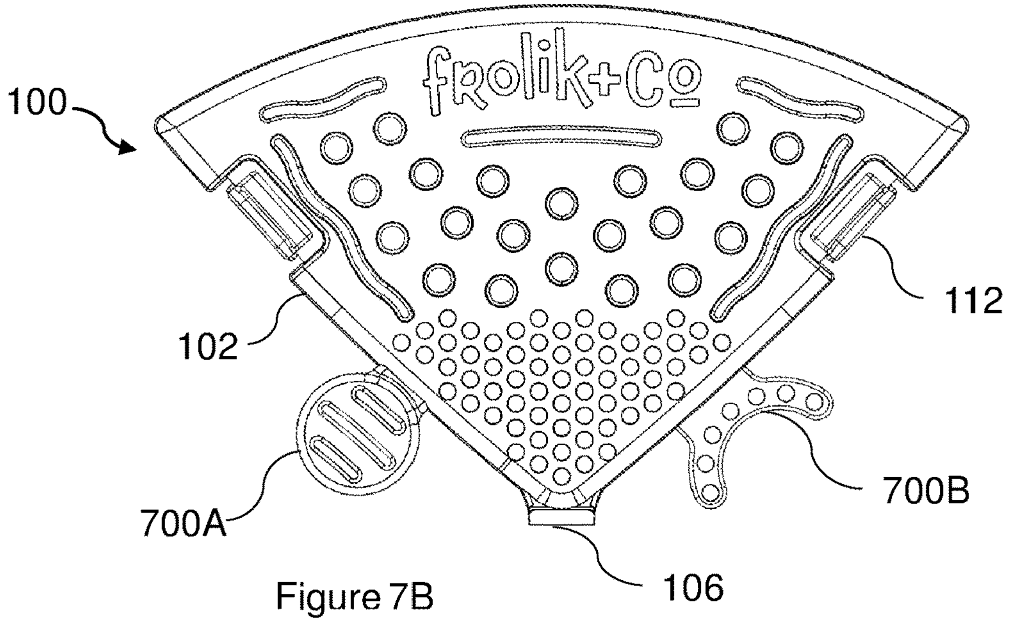

FIGS. 7A and 7B show an example teething aid, for example the teething aid of FIGS. 1 to 6, wherein the teething aid further comprises at least one additional chewable element 700. In the example shown in FIGS. 7A and 7B, the teething aid 100 comprises two additional chewable elements 700, wherein the first portion 102 comprises a first additional chewable element 700A, and the second portion 104 comprises a second additional chewable element 700B. In this example, as shown in FIG. 7B, the first additional chewable element 700A and the second additional chewable element 700B are arranged such that the first additional chewable element 700A and the second additional chewable element 700B are on opposite edges of the chewable arrangement 103 in the first configuration.

Each additional chewable element 700 is coupled to the chewable arrangement 103. This may be advantageous to increase the chewable surface area of the teething aid 100. In the example shown, each additional chewable element 700 extends from the chewable arrangement 103 in a plane parallel to the plane of the chewable arrangement 103. In the example shown, the first additional chewable element 700A is substantially circular, whereas the second additional chewable element 700B has a parabolic shape. However, the skilled person will understand that any other suitable shapes may be used, for example but not limited to at least one of triangles, circles, polygons, spheres, semi-circles, semi-spheres, or any other suitable shape.

The additional chewable elements 700 comprise an external surface, wherein at least a portion of the external surface may comprise moulded shapes 702. The moulded shapes 702 may include relief or protruding surface shapes. The moulded shapes 702 may comprise at least one of ridges, triangles, circles, spheres, semi-circles, semi-spheres, undulating lines, chevrons, herringbones, or any other suitable shape. In the example shown, the first additional chewable element 700A comprises a plurality of ridges or relief lines 702A, and the second additional chewable element 700B comprises a plurality of circles or semi-spheres 702B. However, the skilled person will understand that in other examples, each additional chewable element 700 may comprise any other suitable moulded shape(s), and/or a combination of different types of moulded shapes.

In this example, the additional chewable elements 700 are made of the same material as the chewable portion 103, for example a resilient material. However, the skilled person will understand the additional chewable elements 700 may be made of a resilient material, a stiff material, for example the same material as the support structure 200, or a combination of a resilient material and a stiff material, for example wherein the stiff material may be at least partially embedded, encapsulated and/or overmoulded in the resilient material. In some examples, the additional chewable elements 700 may be coupled to and/or integrated with the support structure 200.

The additional chewable elements 700, optionally including the moulded shapes 702, are configured to soothe and/or massage gums in use, for example to stimulate teething. Each additional chewable element 700 may also be configured to act as a handle portion for the teething aid 100, for example wherein the additional chewable element 700 is configured to be easily gripped by an infant, for example to bring the teething aid 100 to the mouth in use.

The additional teething elements 700 shown in FIGS. 7A and 7B are shown in relation to the example teething aid 100 of FIGS. 1 to 3; however the skilled person will understand that any other example teething aid, for example the example teething aids of FIGS. 5 to 6, may also comprise at least one additional teething element.

Figure 8:
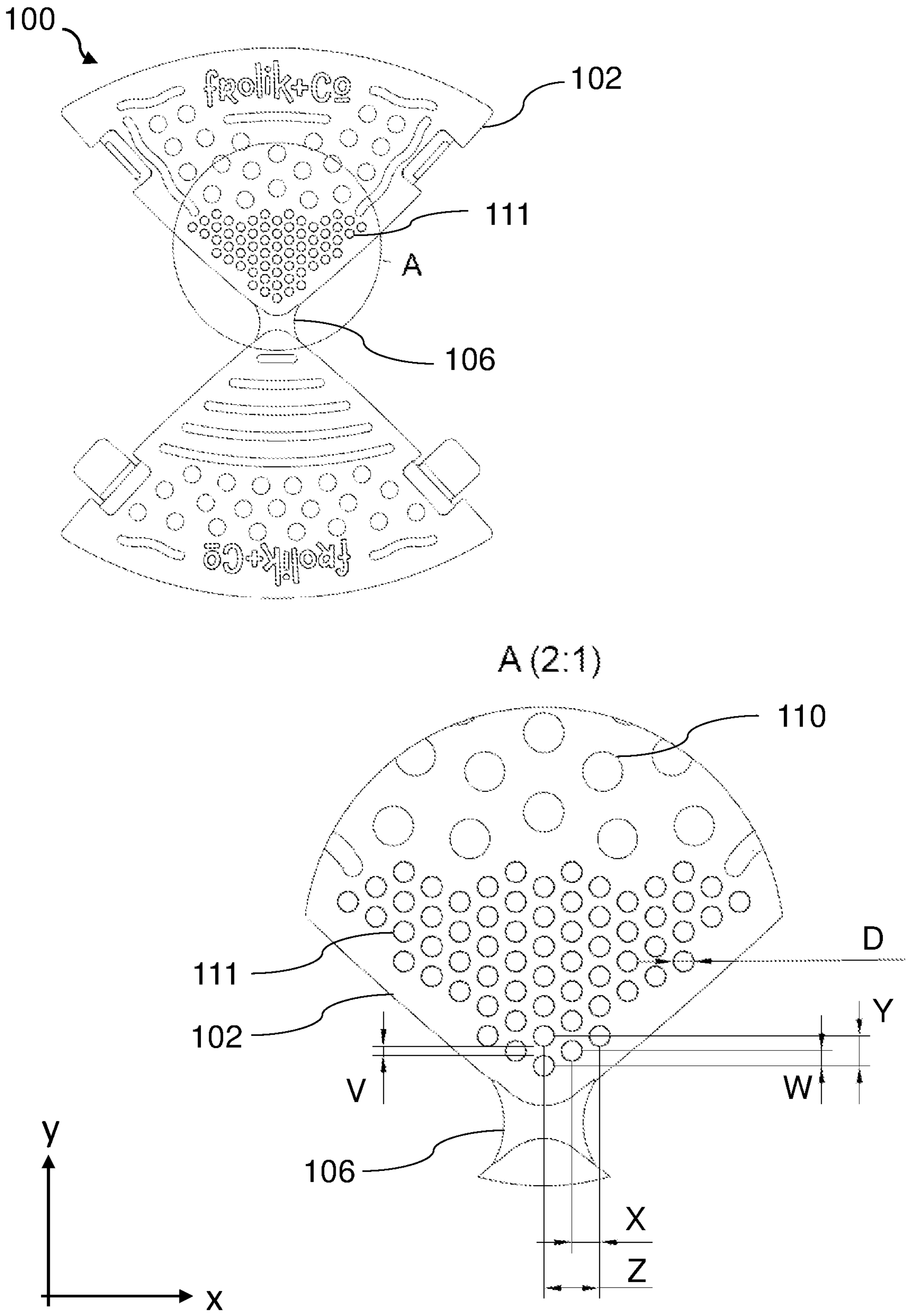
FIG. 8 shows an example region of semi-spherical surface protrusions for a teething aid, for example any of the example teething aids of FIGS. 1 to 7, wherein the semi-spherical surface protrusions are configured to hold teething gel.

FIG. 8 shows an example region of semi-spherical protrusions 111 arranged proximal to an edge of the chewable arrangement 103. In this example, the semi-spherical protrusions 111 arranged proximal to an apex of the first portion 102 of the chewable arrangement 103.

The semi-spherical protrusions 111 have a diameter of D, and a protrusion height of H from the external surface of the chewable arrangement (H not shown). In some examples, H may be equal to or less than twice the diameter D (2D). The semi-spherical protrusions have a spacing in the y-direction of V from circumference to circumference of adjacent protrusions, and Y from centre point to centre point. In this example, spacing Y is twice the distance of spacing W. In some examples, the spacing between any two adjacent semi-spherical protrusions, for example spacing V, is equal to or less than D. The semi-spherical protrusions 111 have a spacing in the x-direction of Z from centre point to centre point of adjacent protrusions. In this example, spacing Z is twice the distance of spacing X. In this example, the semi-spherical protrusions 111 are arranged in diagonal rows, also with V spacing from circumference to circumference between diagonally adjacent protrusions and W spacing from centre point to centre point. In this example, the alignment of semi-spherical protrusions in adjacent diagonal rows is staggered, for example similar to a half repeat pattern.

In this example, the semi-spherical protrusions have a diameter, D, of 2.11 mm, and a height, H, of 1.5 mm. The semi-spherical protrusions have a spacing, V, of 0.89 mm from circumference to circumference, and Y of 3 mm from centre point to centre point. The semi-spherical protrusion spacing Z is 5.6 mm from centre point to centre point. The semi-spherical protrusions are arranged in diagonal rows, also with 0.89 mm spacing on the diagonal from circumference to circumference and 1.5 mm spacing from centre point to centre point.

The plurality of semi-spherical protrusions 111 are configured to augment the gums during use, for example wherein the protrusions 111 are configured to stimulate teething, and massage and soothe the gums. The plurality of semi-spherical protrusions 111 are also configured to hold teething gel, for example a dose of teething gel. This may be advantageous to act as a gentle toothbrush for infants, configured to gently clean the gums and new teeth. The assembly of semi spherical protrusions 111 may be configured to hold teething gel as a result of the spacing between semi-spherical protrusions being significantly less than the circumference of the protrusions, and/or the height of the semi-spherical protrusions being significantly more than the spacing between the protrusions.

However, the skilled person will understand the arrangement described above in relation to FIG. 8 is merely an example configuration, and other suitable arrangements, assemblies, configurations, sizes, and spacings of moulded shapes, including semi-spherical protrusions, may be used. Similarly, the semi-spherical protrusions 111 of FIG. 8 are shown in relation to the example teething aid 100 of FIGS. 1 to 3; however, the skilled person will understand that any other example teething aid, for example the example teething aids of FIGS. 5 to 6, may also comprise a region of semi-spherical protrusions 111, preferably wherein the region of semi-spherical protrusions 111 arranged proximal to an edge or apex of the chewable arrangement 103. In some examples, at least one region of the semi-spherical protrusions 111 may be located in another area of the external surface of the chewable arrangement, instead of or in addition to a region arranged proximal to an edge or apex of the chewable arrangement 103.

In the examples shown in FIGS. 1 to 8, the first portion 102 and the second portion 104 of the chewable arrangement 103 each have a substantially triangular shape. However, the skilled person will understand this is merely an example, and the chewable arrangement 103 may comprise any other shape, for example wherein the first portion 102 and the second portion 104 of the chewable arrangement have any other shape. For example, the first portion and the second portion of the chewable arrangement may have a substantially rhombus shape, for example wherein the first portion and the second portion each have a substantially rhombus shape, coupled by the connecting portion at a corner point or edge of each rhombus shape. In another example, the first portion and the second portion of the chewable arrangement may each have a substantially circular shape, coupled by the connecting portion at a portion of the outer edge of the first and second portions. Alternatively, the chewable arrangement may comprise any other shape, for example wherein the first portion and the second portion of the chewable arrangement have any suitable shape, including wherein first portion and the second portion of the chewable arrangement may each have a shape such as an animal, logo, character, third-party intellectual property, an object, or any other suitable shape. Preferably, the shape of the first portion is substantially the same as the shape of the second portion, for example, reflected about the connecting portion; however, the skilled person will understand this is not required. The chewable arrangement may be configured to reversibly attach to a portion of fabric by clamping the portion of fabric between the first portion and the second portion of the chewable arrangement, regardless of the shape of the first and second portion.

In the context of the present disclosure other examples and variations of the apparatus and methods described herein will be apparent to a person of skill in the art.

The invention claimed is:

1. A teething aid, comprising:

a chewable arrangement, comprising a first portion and a second portion; and at least one clip arranged at an edge of the chewable arrangement, the at least one clip comprising a hook portion and a dock portion, wherein the hook portion is arranged at an edge of the second portion of the chewable arrangement, and the dock portion is arranged at an edge of the first portion of the chewable arrangement, wherein the hook portion is coupled to the edge of the second portion of the chewable arrangement by a hinge, wherein the at least one clip is configured to reversibly attach and detach the chewable arrangement to a portion of fabric by reversibly securing the chewable arrangement in a first configuration, and wherein the chewable arrangement is configured to clamp the portion of fabric between the first portion and the second portion of the chewable arrangement in the first configuration.

2. The teething aid of claim 1 further configured to be transitioned between the first configuration and a second configuration, wherein in the second configuration, the first portion and the second portion of the chewable arrangement are displaced relative to the first configuration, such that the chewable arrangement is configured to detach from the portion of fabric.

3. The teething aid of claim 1 further comprising a connecting portion, wherein the first portion and the second portion are coupled together by the connecting portion.

4. The teething aid of claim 3 wherein the connecting portion of the chewable arrangement couples together (i) a corner point of the first portion and a corner point of the second portion; or (ii) an edge of the first portion and an edge of the second portion.

5. The teething aid of claim 3 wherein the connecting portion comprises a hinge.

6. The teething aid of claim 1 wherein the chewable arrangement further comprises an external surface, wherein at least a portion of the external surface comprises molded shapes configured to soothe and/or massage gums.

7. The teething aid of claim 6 wherein at least a portion of the molded shapes on the external surface comprise semi-spherical protrusions configured to hold teething gel.

8. The teething aid of claim 1 wherein the chewable arrangement further comprises a gripping means, wherein the gripping means is configured to grip a portion of fabric.

9. The teething aid of claim 8 wherein the gripping means is configured to provide an interlocking grip in the first configuration, comprising at least one male portion and at least one female portion.

10. The teething aid of claim 1 wherein the chewable arrangement has a substantially hour-glass shape.

11. The teething aid of claim 1 wherein the first portion and the second portion of the chewable arrangement each have a substantially triangular shape, and wherein the triangular shape of the first and second portions are configured to reversibly attach to a corner of fabric in the first configuration.

12. The teething aid of claim 1 wherein the chewable arrangement is formed at least in part from a resilient material.

13. The teething aid of claim 12 wherein the chewable arrangement comprises a support skeleton configured to provide rigidity and strength to the chewable arrangement, wherein the support skeleton is made of a stiffer material than the resilient material.

14. The teething aid of claim 13 wherein the support skeleton provides a frame for the resilient material.

15. The teething aid of claim 13 wherein the support skeleton is at least partially embedded in the resilient material.

16. The teething aid of claim 13, wherein the support skeleton is bonded to the resilient portion of the chewable arrangement through chemical bonding, mechanical bonding or adhesive.

17. The teething aid of claim 13 wherein the support skeleton comprises a gripping means, wherein the gripping means is configured to grip a portion of fabric.

18. The teething aid of claim 13 wherein the support skeleton comprises the at least one clip.

19. The teething aid of claim 1 further comprising at least one additional chewable element coupled to the chewable arrangement, configured to increase the chewable surface area of the teething aid.

* * * * *